OSCILLATOR SYNCHRONIZATION

Filed Aug. 12, 1952 2 Sheets-Sheet 1

INVENTOR.

Richard W. Sonnenfeldt

BY

ATTORNEY

INVENTOR.
Richard W. Sonnenfeldt
BY [signature]
ATTORNEY 2,748,191
Patented May 29, 1956

1

2,748,191

OSCILLATOR SYNCHRONIZATION

Richard W. Sonnenfeldt, Haddonfield, N. J., assignor to Radio Corporation of America, a corporation of Delaware Application August 12, 1952, Serial No. 303,855

2 Claims. (Cl. 178—69.5)

The present invention relates to electric wave generating circuits and means for establishing and controlling the frequency and phase thereof.

In more particularity, although not necessarily exclusively, the present invention relates to improvements in synchronizing and controlling the frequency and phase of cathode ray beam deflection circuits of the type frequently employed in television receiving systems.

The present invention further embraces a novel and particularly useful pulse processing circuit heretofore unknown in the art. The processing circuit provides a ready comparison means for determining the timing between two sets of pulses and may be made to display characteristics closely simulating balanced phase detector systems, yet being inherently an unbalanced type of phase detector.

The present invention is furthermore an improvement over my U. S. Patent No. 2,734,945, titled Wave Generating Systems, issued February 14, 1956.

As pointed out in the above referenced patent, the problem in the television art of affording precision synchronization of television deflection signal generators is of major proportions and is receiving continuing attention. In television receiving apparatus it is necessary to synchronize the deflection signal generators in accordance with synchronizing information derived from the received composite television signal. In the United States, the standard television signal is known as the Radio Manufacturers Association Standard Television Signal.

Synchronizing information is represented in this signal in the form of higher amplitude peaks which peaks (commonly referred to as synch peaks) occur in the direction of black picture information. The synch peaks are in the form of pulses situated on top of what are commonly known as blanking signals which are comprised of sufficiently large excursions to correspond to an illumination datum of zero intensity in the reproduced scene. According to the R. M. A. television standards, this form of synchronizing signal is interspersed with video signal information in the modulation of a radio carrier, in which synch peaks represent 100 percent carrier modulation.

As further pointed out in my above referenced patent, the prior art practice has been to separate synchronizing components from the composite television signal on an amplitude threshold or gate basis, in which all signals having an amplitude over an established threshold or gate level, will be allowed to pass. The practice has been to establish the level of the gate or threshold at the amplitude of the blanking component which level corresponds to the bottom or base of the synchronizing signals. In this way, the synchronizing signals are in effect "clipped" off from the composite television signal.

The major disadvantage of this form of synch separation lays in its inherent susceptibility to noise which may occur between synch pulses. This is especially true when the clipping level or threshold is established by rectifying the peaks of synch. With this latter arrangement, noise bursts occurring between synch pulses affect the clipping threshold as though there had been a general increase in the signal level so that there may exist a short period of time following the noise during which synch may not rise above the clipping level of the synch separator. Synch will then not get through the gate and hence the deflection circuits of the television receiver will be momentarily deprived of synchronizing information.

2

In addition to the momentary paralyzing of the synchronizing circuit, noise may successfully get through the gate and produce mis-synchronization of the deflection system. The novel arrangement described in my U. S. Patent No. 2,734,945, referenced above, provides a combination wave form generating and frequency control system which does not require the separation, per se, of synchronizing signal from a composite signal having numerous components. The circuit provides self-immunization through "keyed" gating action against noise, during the intervals between synchronizing signals. The invention is described in the referenced U. S. Patent No. 2,734,945, as being particularly useful since it can be practiced with a minimum of electron tubes and circuit elements yet providing a general improvement over most forms of television deflection systems, even of the automatic-frequency-control type, well known in the art.

In one of its more simple forms, the invention described in my above referenced Patent No. 2,734,945, could employ but two major elements. First, an oscillator which produces a sawtooth of deflection voltage, as well as a keying pulse. Second, an electron tube acting as a comparing means between the keying pulse and the synchronizing component of the composite television signal. The occasional coincidence between the keying pulses and the received synch pulses, produces a correction signal which, when applied to the oscillator, corrects the frequency of the oscillator to a value corresponding to the arriving synchronizing pulses, and lock-in therewith is established. Noise immunity is inherent in such an arrangement, since synchronizing pulses cannot pass through to the oscillator unless it be during the interval of a keying pulse. Moreover, in accordance with the invention described in my above referenced patent, the clipping or threshold level afforded by the keying action of the coincidence tube is dependent upon rectification by the coincidence tube of a portion of the synchronizing signal. This means that the average current through the coincidence tube changes considerably in response to a condition of no signal reception and signal reception.

In such an arrangement, as described in my above referenced patent, the frequency of the oscillator which produces the keying pulses (as well as deflection signal) is preferably established above the frequency of the arriving synchronizing signals or else pull-in and lock-in between the synch pulses and oscillator is not positive in action. However, it has been found that the change in circuit conditions flowing from no received signal, versus received signal conditions, causes a wide shift in the frequency of the oscillator so that the oscillator frequency would not maintain itself at the desired operating frequency; namely a frequency above the arriving synchronizing pulses. Although this phenomenon is undesirable in certain cases, it must not be considered that the fundamental principles of the arrangements shown and claimed in my above referenced patent are, in any way, reduced in utility and value.

However, to correct this operating peculiarity, it became necessary to evolve a more balanced type of signal comparing system which could be applied to the general arrangement disclosed in the above referenced system. The balanced type of operation stemming from the practice of the present invention, results in the application of keying pulses not only to one input of a coincidence detector element but in part to both inputs of the coincidence detector, especially during the "keyed-on" period of the detector.

In accordance with the present invention, and in those cases where a single triode is utilized as a coincidence detector, a first set of signals to be compared is applied to the control electrode of the triode while a second set of signals (acting as a comparison signal) is applied to the anode of the triode. At the same time, in accordance with the present invention, a part of the second set of signals is made to appear in the control electrode-cathode path of the triode in the same phase as it is applied to the anode. In this way, the output signal of the comparison detector is made relatively independent of the presence or absence of the first set of signals. Furthermore, the present invention provides the characteristic that when the first set of signals is present, an output signal will be developed if there is a difference in phase or frequency between it and the second set of signals. Thus, a balance type of phase detector operation is achieved, yet with the simplicity of a single or unbalanced type of signal detector structure.

It is, therefore, seen that one object of the present invention is to provide an improved pulse comparator circuit whose output signal is rendered a function of substantially only the difference in phase and frequency that exists between two input signals.

It is further an object of the present invention to provide an improved and simplified coincidence detector for producing an output voltage representing the degree of coincidence between a plurality of signal wave forms.

It is further an object of the present invention to provide an unbalanced phase detector circuit which has characteristics closely simulating those obtained from balanced types of phase detector systems.

It is still a further object of the present invention to provide an improved deflection synchronizing system for television receivers.

Another object of the present invention resides in the provision of an improved and simplified automatic frequency controlled circuit for cathode ray beam deflection systems.

It is still further a general object of the present invention to improve the overall performance characteristics of commercial television receivers, and at the same time, reduce their manufacturing cost.

It is yet another object of the present invention to provide a new and novel deflection circuit for television receivers which has a high noise immunity as well as exceptional operating stability and sensitivity.

Other objects, as well as advantages, of the present invention, will become apparent as the description thereof, hereinafter set forth, proceeds.

The invention itself will be best understood both as to its mode of operation and possible methods of practicing the same by reference to the specification, especially when taken in connection with the accompanying drawings, in which.

Figures 1, 1A, 2A:
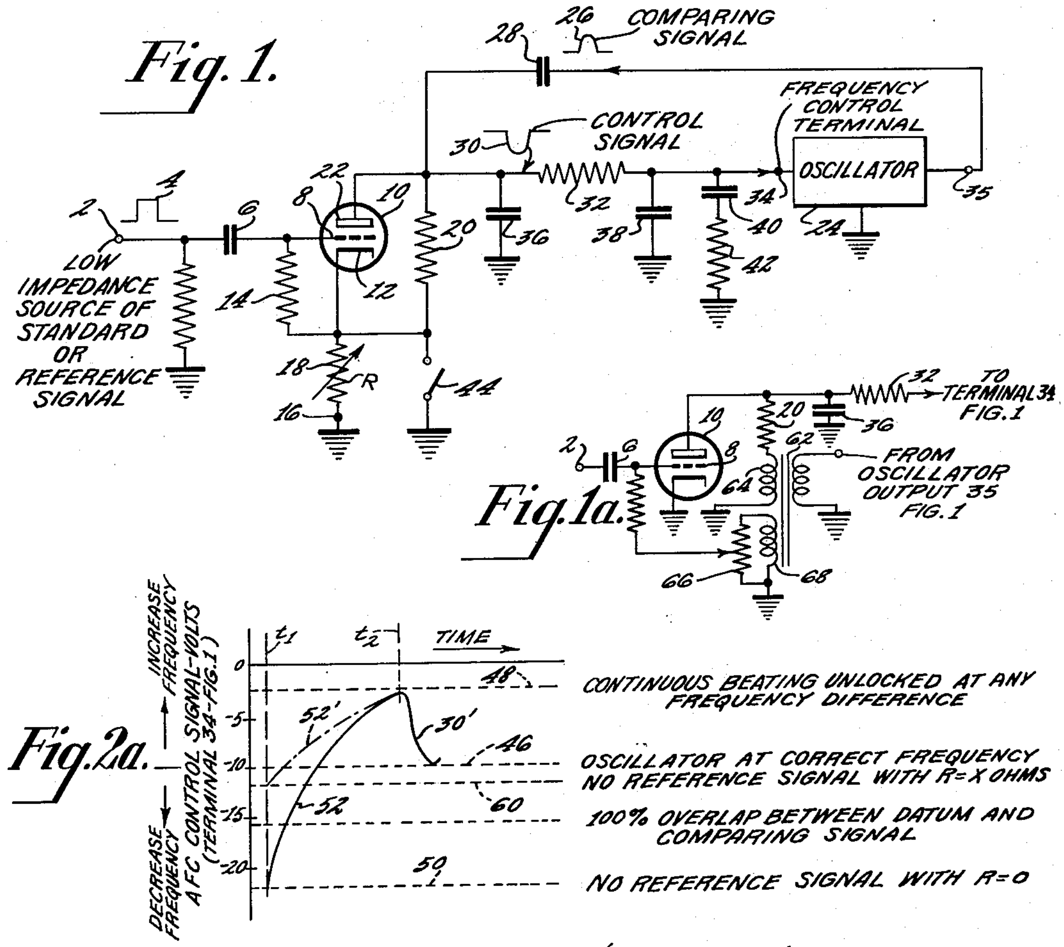
Fig. 1 is a combination block and schematic representation of a basic form of the present invention.

Referring now to the embodiment of the present invention shown in Fig. 1, there is shown at 2 an input terminal referenced to datum or ground potential acros which is designated to appear a periodically recurring signal whose frequency may be considered a standard or reference for the control of an oscillator circuit. The standard or reference signal 4 appearing at this terminal is capacitively coupled via capacitor 6 to the control electrode 8 of a discharge tube 10 shown by way of example, as being of the triode variety. The control electrode 8 is provided with a D.-C. path to the cathode 12, via the grid return resistor 14. The cathode 12 is then provided with a D.-C. path to ground or datum potential terminal 16, via the resistance 18. A load resistance 20 is connected between the anode 22 of the triode and the cathode 12.

An oscillator 24 shown in block form and whose frequency is to be controlled is adapted to supply a comparing signal 26, representing the operating frequency of the oscillator. The comparing signal 26 is coupled via capacitor 28 to the anode 22 of the triode 10. The control signal 30 developed by the triode 10, as hereinafter more fully described, is applied through resistance 32 to a frequency control terminal 34 of the oscillator 24. The frequency control terminal 34 is such that a negative going excursion of the terminal 34 will produce a corresponding decrease in the frequency of the oscillator 24 whereas a positive swing in the potential of terminal 34 with respect to ground, will produce an increase in the frequency of the oscillator 24. Suitable filter capacitors 36, 38 and 40, the latter acting in conjunction with resistance 42, serve to provide a low-pass filter between the anode 22 and the frequency control terminal 34 of the oscillator 24.

In describing the operation of the present invention, in the form shown in Fig. 1, a switch 44 connected in shunt with the resistance 18 will be at first assumed closed, thereby shunting out the resistance 18. The switch 44 is not essential in the operation of the present invention, but is shown only for the purpose of later describing the beneficial action derived from connection of resistance 18 in the cathode circuit of the tube 10.

With switch 44 closed, the vacuum tube 10 will act as a simple coincidence detector, the voltage developed across load resistance 20 indicating the degree of coincidence between the reference signal 4 and the comparing signal 26. Under such conditions the amplitude of the reference signal 4 is made sufficient that when rectified by the control electrode-cathode path of tube 10, the R-C coupling network will develop a negative cutoff bias on the control electrode 8. This means that the anode cathode path of tube 10 will be blocked except during the positive going extremities of the reference signal.

Figure 4:
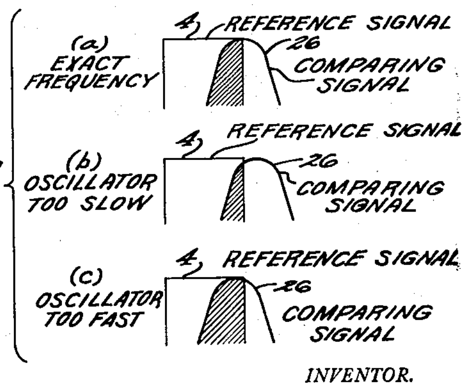
Fig. 4 is still another graphical representation of certain electrical waveforms developed in the practice of the present invention, as shown for example in Fig. 1.

On the other hand, conduction in the anode cathode path of tube 10 cannot occur except during comparing signal 26 for at other times the anode 22 of tube 10 is negative with respect to the cathode. Thus it is that current through resistance 20 can occur only during at least partial coincidence between the comparing signal 26 and the reference signal 4. If, as stated in my above referenced U. S. Patent No. 2,734,945, the coincidence detection waveform developed across load resistance 20 is applied through a low-pass filter to a frequency control circuit for an oscillator, the proper polarity and correction sense being achieved, the coincidence detector shown may be used as an AFC circuit for the oscillator. For example, let it be assumed that it is desired to lock in operation of oscillator 24 with the reference signal 4 such that any tendency of oscillator to speed up, or slow down with respect to the reference signal will be compensated. Let it further be assumed that the potential of the frequency control terminal 34 must be an arbitrary minus ten volts in order to establish the oscillator at a frequency corresponding to the reference sginal 4. This, by way of example, is shown by the dotted line 46 in Fig. 2. The amplitude of comparing signal 26 is then adjusted such that when bisected by the trailing edge of the reference signal 4 as shown in Fig. 4*a*, a potential of minus ten volts will be developed at the terminal 34.

With switch 44 closed, and under the above postulated conditions, it will be seen that if coincidence between the reference signal and comparing signal does not obtain, the oscillator 24 will tend to run too fast. This follows since under these conditions, the only conduction permitted in tube 10 will be that corresponding to the occasional coincidence, on a beat frequency basis, between the comparing signal and the reference signal. The upper terminal of resistance 20 then will be more positive and will correspond to a voltage represented, for example, by the dotted line 48 in Fig. 2*a*. However, the occasional coincidence between the comparing signal and reference signal on a beat basis will produce an alternating current signal across the resistance 20 as shown at 30 in Fig. 1, which signal may be referred to as a control signal.

Figure 3:
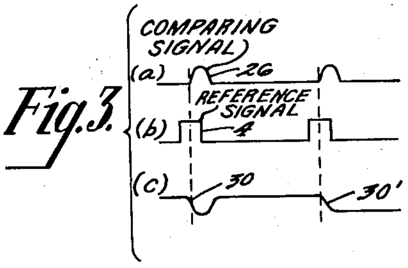
Fig. 3 is a graphical representation of the relationship between other electrical waveforms encountered, for example, in the arrangement illustrated in Fig. 1.

The manner in which this control signal is formed is shown more clearly in Fig. 3, where the signal in line 3*a* represents the comparing signal 26, the signal on line 3*b* represents the reference signal 4, and the resultant control signal is shown on line 3*c* at 30. The control signal 30 is a transitory type of signal for it can exist as shown at 30 only if it is assumed that a net frequency difference continues to exist between the oscillator 24 and the reference signal 4.

In practice, and as explained in my above referenced U. S. Patent No. 2,734,945, issued February 14, 1956, the negative going front edge of the control signal 30 is sufficient to swing the frequency of the oscillator 24 to the correct frequency as shown in Fig. 2*a*. In Fig. 2*a* the downward slope 30′ of the waveform there shown corresponds to the front edge of the control signal 30. Once the oscillator 24 has been brought to the correct frequency the condition of Fig. 4*a* is established. Should the oscillator thereafter tend to slow down, it will be seen that the area common to the comparing signal and reference signal becomes less thereby reducing the average current through resistance 20 and tending to make the frequency control terminal 34 more positive, thereby speeding the oscillator up. This is shown in Fig. 4*b*. In Fig. 4*c* it can be seen that as the oscillator tends to speed up the area between comparing signal and reference signal is increased, thereby increasing the current passing through resistor 20 and making more negative the frequency control terminal 34. This, of course, will slow the oscillator down until the condition of Fig. 4*a* is again established.

It is thus seen that the arrangement of Fig. 1 provides a pull-in action and a lock-in action, provided the frequency of the oscillator 24 is above that of the reference signal 4 at the time pull-in is desired. This, of course, will always be the case if reference signal 4 is continuously applied to the control electrode 8 of the tube 10, since the potential level 48, shown in Fig. 2 is established at the terminal 34 for the condtion of continuous beating on an unlocked basis, between reference and comparison signals of different frequencies.

However, should the reference signal 4 be interrupted prior to the attempt to pull in the oscillator 24 with the reference signal, an undesirable condition may obtain. This stems from the fact that when no reference signal is applied to the tube 10, the comparing signal 26 will be rectified fully to produce a maximum negative potential at the frequency control terminal 34. Such a maximum value, with switch 44 still closed may be indicated at 50 in Fig. 2. Assuming that the reference signals 4 were applied to the input of terminal 2 at a time ($t-1$), it can be seen that a considerable amount of time would have to elapse before the oscillator 24 could possibly be pulled in to synchronism with the reference signal. Curve 52 depicts this fact; the action would be as follows:

The application of reference signal to a terminal 2 would, through grid rectification, produce a negative bias on the control electrode 8. This would then block the tube as previously explained except for occasional coincidence on a frequency basis between the comparing signal and the reference signal, thus the voltage at terminal 34 would slowly rise up to the level 48 representing that value of potential developed at terminal 34 for a continuous beating or unlocked condition between the comparing and reference signals. The rate of voltage change at terminal 34 is so great as it passes through the minus 10 volt level shown at 46 in Fig. 2 that the chances of lock-in between the oscillator and reference signal at this instant is exceedingly small. Thus, it is that the circuit must wait until after a time ($t-2$) before lock-in is made positive through the action of the control signal 30 described above.

In accordance with the present invention, this sometimes undesirable feature is overcome since a balanced type of coincidence detection action is obtainable through the provision of resistance 18.

Figure 2B:
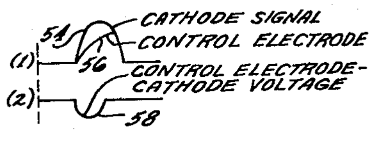
Fig. 2 is a graphical presentation of certain electrical characteristics encountered in the practice of the present invention, as for example illustrated in Fig. 1.

Assuming now that switch 44 is open (or absent, as is the case in the practice of the present invention) it will be seen that a portion of the comparing signal 26 is permitted to be applied to the control electrode 8, by means of resistance 18. If it is now further assumed that the source of the reference signal is of relatively low impedance, compared to the resistance of the grid return resistor 14, the following action will obtain:

A cathode signal will be developed at the upper terminal of cathode resistor 18, which will resemble in waveform the comparing signal 26. This is shown at 54 in Fig. 2*b* (1). However, since the resistance 14 is rather high compared with the internal impedance of the reference signal source, the capacitor 6 will act as an integrating capacitor, hence the control electrode voltage 56, in the absence of the application of reference signal, will appear as shown in Fig. 2*b* (1). This integrating action will keep the control electrode 8 from swinging as positively as the cathode 16 during the interval of the comparing signal. Immediately following the interval of the comparing signal the control electrode, due to the charge accumulation on capacitor 16 will appear positive with respect to the cathode 16 and hence the capacitor 6 will be discharged through control electrode-cathode current flow. This accounts for the sawtooth appearance of the control electrode voltage 56 Fig. 2*b* (1). Thus, during the major part of the comparing signal interval, the control electrode cathode voltage shown at 58 in Fig. 2*b* (2) will be negative, therefore reducing the current produced by the rectification of the comparing signal 26. By adjusting the amplitude of the signal 58 allowed to appear at the control electrode 8, during the comparing signal, the voltage at the frequency control terminal 34 may be made to assume any value betwene the value at level 50 Fig. 2*a* (corresponding to a zero value of cathode resistance 18) up to the level 48 shown in Fig. 2*a* (corresponding to the continuous beating or unlocked voltage value). By proportioning the values of resistance 20 and resistance 18 and also by adjusting the values of resistance 14 with respect to the source impedance of the reference signal, and further by adjusting the value of capacitor 6, any output voltage value between level 50 and level 48 in Fig. 2*a* may be obtained. By way of example, level 60 has been indicated in Fig. 2*a* as one voltage value which will obtain in the absence of reference signal when the present invention is practiced.

Thus when practicing the present invention it is seen that when reference signal is first applied to terminal 2 at time $(t-1)$ (Fig. 2*a*) the frequency control terminal 34 will be very much closer to the desired voltage level 46 than previously was permitted in the absence of reference signal. Hence, the rate of change illustrated by the dot-dash curve 52′ of the voltage at the frequency control terminal 34 as it passes through voltage level 46 corresponding to correct frequency operation, will be much slower than illustrated by solid curve 52.

In practice, it is found that due to this lower rate of voltage rise at terminal 34 at the time the terminal 34 passes through the correct frequency voltage 46, the oscillator 24 will lock-in to synchronization with the reference signal 4. This is based upon the well known fact that once an oscillator comes within a small fraction of a percent of a frequency to which it is to be synchronized, very little energy is required to accomplish the necessary correction for exact lock-in or synchronization. However, as pointed out above, the greater the rate of change in the frequency of the oscillator at the time it approaches the proper frequency, the less likelihood there is of lock-in.

In the practice of the present invention, the required corrective voltage feedback at the control electrode of the tube 10, or more broadly, the required feedback of one signal to be compared to the terminal designated to receive the other signal to be compared, may be accomplished in a variety of ways. Fig. 1*a* illustrates another method of feeding back comparing signal 26 to the control electrode 8 of the discharge tube 10. Instead of utilizing capacitor 28 shown in Fig. 1, connected from the output of oscillator 24 to the anode 22 of discharge tube 10, the output of oscillator 24 is applied to the primary winding of a transformer 62. The secondary 64 of this transformer is connected between the load resistance 20 and ground potential, thus producing through the resistance 20 a D. C. current flow corresponding to the rectification of the comparing signal 26. The necessary corrective feedback to establish a desired reference level such as 60 in Fig. 2*a* is then accomplished by adjustment of potentiometer 66, connected across another secondary winding 68. The arm on potentiometer 66 connects with the control electrode 8 of tube 10 via the grid leak resistance 14.

Figures 5, 6:
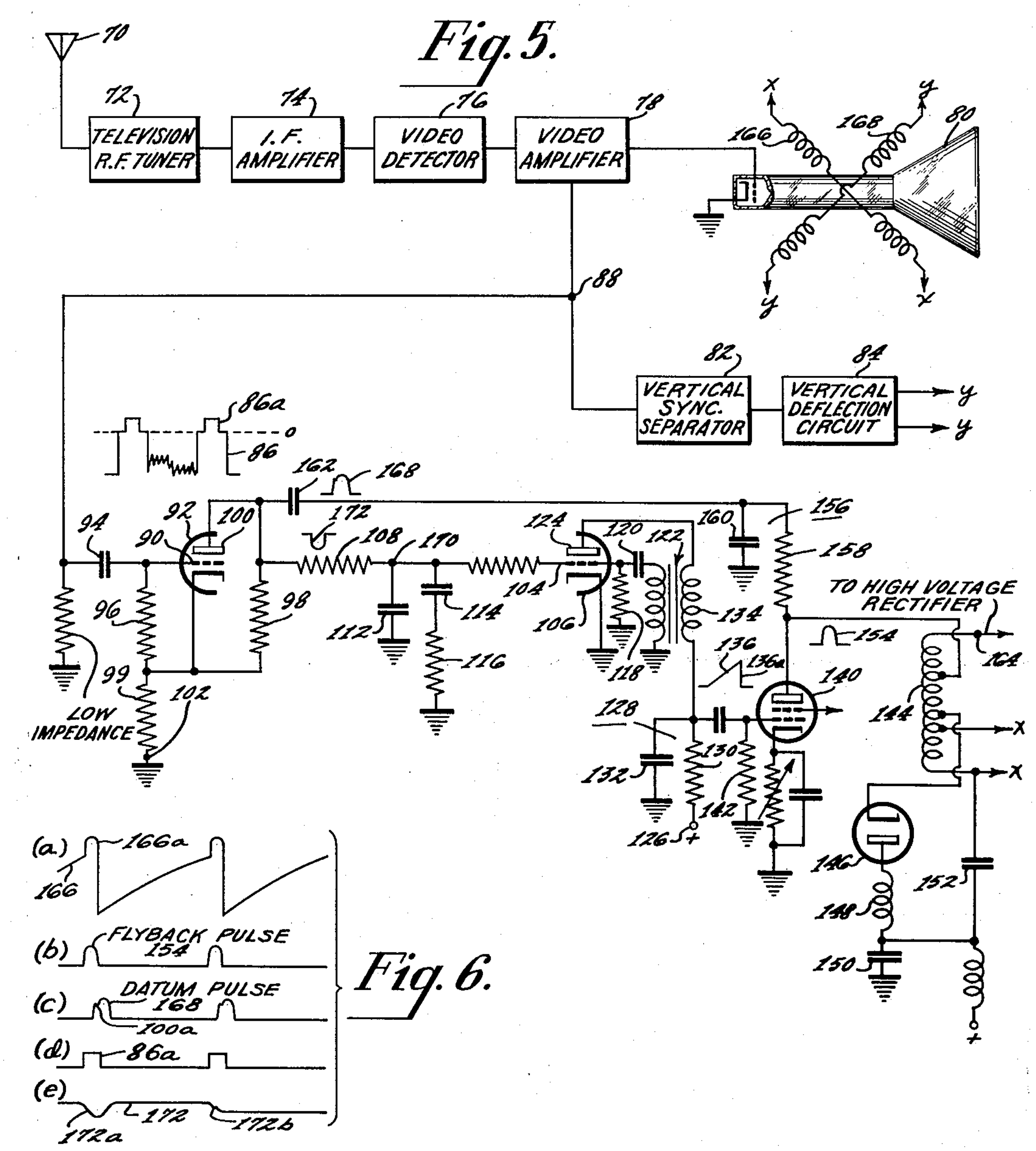
Fig. 5 is a combination block diagram and schematic representation of another embodiment of the present invention as applied to the deflection functions of present day television receivers.
Fig. 6 is a graphical representation of certain electrical waveforms encountered in the practice of the present invention, as for example, set forth in Fig. 5.

The novel features of the present invention find application to various circuit arrangements. For example, in Fig. 5 the present invention is illustrated in connection with a typical television receiving system. There is shown in Fig. 5 at 70, a television receiving antenna adapted to feed received television signals to the RF tuner 72 of a television receiving system. The output of the RF tuner 72 is applied to an I. F. amplifier 74 whose output in turn is supplied to the video detector 76.

From the output of the video detector 76 demodulated video signal is applied to the video amplifier whose output is conventionally applied to modulate the electron beam of a cathode ray picture reproducing tube, or or kinescope 80.

Video signal at a suitable amplitude is also applied to a typical prior art synchronizing signal separator 82 whose function is to separate synchronizing signal components of received video signal and apply them in a conventional manner for the control of the vertical deflection circuit 84. Suitable circuitry for inclusion in the block elements shown and discussed above, as well as throughout this entire specification are well known in the art and are to be found in the literature, for example, in the "Radio Electronics Magazine," November 1950, pages 34 and 36, under the title of "Radio Set and Service Review" and also in the "RCA Review" for March 1947, pages 5 through 28.

In accordance with the embodiment of Fig. 5, the video signal 86 appearing at the terminal 88 of the video amplifier 78 is also coupled to the control grid 90, of electron tube 92 via capacitor 94. A suitable control grid return for tube 92 is supplied by the resistor 96. An anode cathode load for the tube 92 is supplied by means of resistor 98, connected from anode 100 to the cathode 101. Resistor 102 is then connected, in accordance with the present invention, from cathode 101 to ground or datum potential. Signal waveforms appearing at the anode 100 of tube 92 are coupled to the grid 104 of electron tube 106 by means of resistors 108 and 110. Suitable time constant networks are provided by condensors 112 and 114 taken in connection with resistor 116. These latter elements provide one common form of low-pass filter network having a quite linear phase response. Other forms of low-pass networks may be used in the practice of the present invention.

Electron tube 106 is connected as a well known blocking oscillator which includes the grid ground return resistor 118, coupling capacitor 120 and blocking oscillator transformer 122. The anode 124 of vacuum tube 106 is supplied with operating potential from a positive power supply terminal 126 through a sawtooth discharge network 128 (comprising resistor 130 and capacitor 132) and thence through the primary 134 of the blocking oscillator transformer 122. The sawtooth waveform 136 developed across the sawtooth discharge network 128 is capacitively coupled via capacitor 138 to the input of deflection driving tube 140. A grid ground return impedance for the driver tube 140 is provided by resistor 142.

The direct drive deflection circuit connected with the tube 140 and including auto transformer 144, damper tube 146, inductance 148 and capacitors 150 and 152, is well known in the art and is described in the John F. Rider Publishing Co. publication entitled "Television Service Notes," vol. 9, pages RCA 7–78, published in 1951.

The well known deflection flyback pulse 154 appearing at the anode of electron tube 140 is applied to a delay network 156 comprising resistor 158 and capacitor 160. The signal appearing at the output of the delay network 156 is applied at capacitor 162 to the anode 100 of vacuum tube 92. A higher voltage version of the flyback pulse 154 appears, of course, at the upper terminal 164 of the auto transformer 144 in accordance with the widely used technique of rectifying the same for use as high voltage beam accelerating potential for kinescope 80.

The horizontal and vertical deflection coils represented at 166 and 168 are indicated for corresponding connection across the terminals YY of vertical deflection circuit 84 and the terminals XX of the horizontal deflection circuit.

In understanding the operation of the embodiment of the invention shown in Fig. 5 it should be assumed that all operating potentials have been applied to the elements shown in the drawing and that the electron tubes are in an operative state. It will further be assumed that no video signal is being received by the RF tuner 72.

Under such conditions, the vacuum tube 106 will be active to produce a sawtooth wavefrom 136 by means of the blocking oscillator circuit with which it is connected. As is well known by one skilled in the art, the waveform at the grid 104 of the blocking oscillator tube 106 will appear substantially as shown at 166 in Fig. 6.

The time constant of the capacitor 120, taken in conjunction with resistor 118, is such to maintain the blocking oscillator at an operating frequency slightly above the line repetition rate of the television system, as described in connection with Fig. 1. By way of example, in a 525 line television system, this blocking oscillator would be adjusted to operate by itself in the range of 15,750 C. P. S. Each time the tube 106 becomes conductive, represented by the peak 166*a* of waveform 166 in Fig. 6, the capacitor 132 is discharged to produce the return trace portion of 136*a* of sawtooth 136. This action is well known in the art. Sawtooth deflection waveform 136 is then conventionally used to drive the horizontal deflection output tube 140 so as to produce the above mentioned and well known flyback pulse 154 corresponding to the return trace period of the deflection cycle.

In accordance with the particular embodiment of the present invention, shown in Fig. 5, this flyback pulse 154 is applied to a delay network such as 156 which may comprise an integrating network, including, for example, resistor 158 and capacitor 160. Delay network 156 is designed to produce a suitable delay, whose magnitude and purpose will be later discussed, so as to produce a datum pulse 168 of substantially the same waveform as the flyback pulse only delayed in respect to time thereto. This datum pulse corresponds to the "comparing signal" of Fig. 1. The datum pulse 168 is then rectified by the vacuum tube 92 to produce a negative potential having a pulse component at terminal 170 of capacitor 112. This negative going waveform 172 is then presented to the low-pass filter before being applied to the grid 104 of the blocking oscillator 106. As is well known, the grid cathode potential of the blocking oscillator determines its operating frequency hence the free running frequency of the blocking oscillator 106 will be rendered a function of the voltage appearing at terminal 170. Thus, terminal 170 corresponds to terminal 34 of Fig. 1.

As described with respect to Fig. 5, the vacuum tube 92 is arranged to act as a coincidence detector and so deliver at terminal 170 a signal which will represent the degree of time coincidence between synchronizing voltage, applied to grid 90 and the datum pulse 168 applied to anode 100.

Assuming now the detection by RF tuner 72 of a video carrier there will exist at the terminal 88 of the video amplifier 78 a video signal 86 described hereinabove. Demodulated video signal 86 will then be applied to the grid 90 of the tube 92, thus permitting synch peaks 86*a* to produce sufficient grid current to set up, in the time constant circuit comprising capacitor 94 and resistor 96, a negative bias of sufficient magnitude to permit an anode cathode conduction in tube 92 only during peaks of synch. However, as stated above, conduction in tube 92 can only occur during the interval of datum pulse 168. This is seen since anode 100 is negative with respect to its cathode, as the same above, at all times, except during the duty cycle of datum pulse 168. Thus, anode cathode induction in tube 92 is possible only upon the at least partial coincidence of an arriving synchronizing pulse 170 and the datum pulse 168. The synchronizing pulses 170 correspond to the reference signal 4 of Fig. 1.

Since the free running frequency of the blocking oscillator 106 is desirably above the frequency of the arriving synchronizing pulses 172, anode current through resistance 98 will be established only during the occasional coincidence of pulse 168 with the arriving synch pulses. The time constant of resistances 98 and 108 in combination with capacitance 108 and 112 is such that the occasional coincidence of the datum pulse 168 with the arriving synch pulses will cause a negative going voltage frequency correction signal to be developed across the capacitor 112. If a given frequency difference were permitted to continue, a frequency correction waveform 172*a* shown in Fig. 6*e* would be developed. This waveform can be seen to have a width which is manifestly larger than either the datum pulse 168 of the arriving synchronizing pulse 86*a*. Thus, the datum pulse 168 shown in Fig. 6*c* will be in effect running through the synch pulse 86*a* from right to left (in the figure). This gives the apparent broadening effect to the frequency correction pulse 172*a*.

Let it be assumed that the blocking oscillator 106 has, by way of example, been set at a frequency of 100 cycles above the repetition rate of the arriving synchronizing pulses 86*a*. In such a case every .01 second running coincidence must occur between a synch pulse 86*a* and a datum pulse 168. During this coincidence, the datum pulse 168 will, as noted above, be seen to run through from right to left of the synch pulse 86*a*. The frequency correction output signal 172 appearing at the upper terminal of capacitor 112 will then have a left hand extremity defined by the leading edge of the datum pulse 168.

The right hand extremity of the waveform 172 will, of course, be defined by the right hand extremity or trailing edge of such pulse 172. This again is assuming, as before, that the net frequency difference continues to exist between the blocking oscillator and the arriving synch pulses for an interval long enough to let the datum pulse 168 run completely through the synch pulse 86*a*.

However, in practicing the arrangement of Fig. 5, the blocking oscillator 106 is adjusted so that the downward going front edge of the frequency correction pulse 172 produces sufficient frequency correction of the blocking oscillator 106 to bring the blocking oscillator frequency within at least 1/20 percent of the frequency of the arriving synchronizing pulses. This prevents the completion of the pulse waveform 172*a* so that the actual correction waveform is more properly shown at 172*b*, Fig. 6*e*.

By examining together Figs. 6*c*, 6*d*, 6*e* and Fig. 7*a*, the latter showing a more detailed relationship between the datum pulse 168 and the synch pulse 86*a*, it can be seen that the peak of the correcting signal 172 will substantially correspond to a "half coincidence" position of the datum pulse 168 with the synch pulse 86*a*. As mentioned above, since the oscillator comes within a small fraction of a percent of the frequency to which it is to be synchronized, it requires very little energy to accomplish the necessary correction to produce exact synchronization. In fact, in practice, it is found that oftentimes mere random circuit noise is sufficient to accomplish this synchronization.

Figure 7:
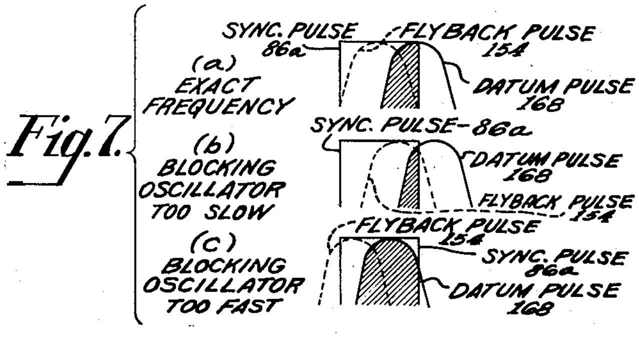
Fig. 7 is still another graphical presentation of electrical waveforms showing their relationship as encountered in the practice of the present invention, shown, for example, in Fig. 5.

Since the blocking oscillator 106 will operate at the arriving synchronizing pulse repetition rate for only a discreet value of bias on the control electrode 104, and since this discreet bias voltage is obtained only when the datum pulse 168 and the synchronizing pulse 86*a* have the specific relationship shown in Fig. 7*a*, conditions along the lower portion of the negative going slope of the frequency correction pulse 169 are ideal for lock-in between the blocking oscillator and the arriving synchronizing pulses. It is for this reason that if the synchronizing pulse 86*a* is first sampled at a time when the datum pulse 168 is to the right of the trailing edge of the synchronizing pulse 86*a*, complete synchronization will occur within the first half of the downward going portion of the waveform 172.

It may also be considered that precise synchronization between the blocking oscillator 106 and the arriving synchronizing pulses, once the blocking oscillator 106 is within at least ten cycles or so of operating at the synchronizing signal repetition frequency, is accomplished by the leading edge of the synch pulse 170, causing a virtually imperceptible nick 172*b* in the datum pulse, which disturbance is fed by stray circuit capacitance to the grid or anode of the blocking oscillator tube 106.

Once the blocking oscillator 106 has been synchronized with the arriving synchronizing pulses and the condition shown in Fig. 6*a* obtains, it will be seen that the automatic frequency control action, described above in connection with Fig. 1, maintains the synchronization thereafter. Should, for example, the blocking oscillator tend to lower its frequency, the datum pulse 168 will, in effect, shift to the right, relative to the synch pulse 86*a* (see Fig. 6*b*) thereby reducing the amount of common area in the coincidence of the datum and synch pulse. This will, of course, reduce the rectified current through resistance 98 of the coincidence detector 92 and reduce the negative potential applied to the grid 104 of the blocking oscillator. As is well known in the art, reducing negative potential on the grid of a blocking oscillator will increase its operating frequency. This corrective action will continue until the condition illustrated in Fig. 6*a* is re-established.

On the other hand, should the blocking oscillator tend to increase its operating frequency, the action illustrated in Fig. 6*c* will occur. The datum pulse 168 will then shift to the left relative to the synch pulse 86*a* thereby increasing the common area in the coincidence of the datum and synch pulse. This will increase the rectified current through the resistor 98 in the anode circuit of the coincidence detector 92, increase the negative control voltage on the grid 104 of blocking oscillator 106 and thereby reduce the blocking oscillator frequency.

As was described in connection with Fig. 1, the novel stabilizing action of the present invention as provided in Fig. 5 by the resistor 102 causes the synchronizing action of the arrangement in Fig. 5 to appear as being of the balanced phase detector variety. That is, the average voltage output of the coincidence detector will not change greatly should there be the absence of synchronizing signals. Thus, in a television receiving system, the present invention assures very rapid lock-in between received synch and the receiver deflection circuits as well as a high degree of noise immunity.

What is claimed is:

1. In an unbalanced phase detecting circuit for developing a control voltage whose magnitude is a function of the relative timing between a first and a second electrical signal of which said first electrical signal is subject to fortuitous interruptions, it being desired in said circuit that the effects of said interruptions on the magnitude of developed control voltage be at a minimum, the combination of: an electrical signal potential datum means; a first source of periodic electrical signal subject to fortuitous interruptions, said source having a discrete output impedance and referenced to said datum means; a second source of periodic electrical signal not subject to the same interruptions as said first source and referenced to said datum means; an amplifying device having electrodes respectively corresponding to a vacuum tube anode, cathode and control electrode; a first resistor connected between said cathode and said datum means; a first capacitor connected from said second source of signals to said anode for coupling said signals to said anode with a polarity tending to produce anode current flow in said amplifier; a second resistor directly connected between said anode and said cathode of sufficient value to permit said anode current flow to develop a control voltage at said anode whose average value is of a desired magnitude, the connection of said second resistor further providing means for developing a signal variation at said cathode corresponding to signals from said second signal source; a second capacitor connected from said first signal source to said control electrode; and a third resistor galvanically connected directly from said control electrode to said cathode, the value of said third resistor being substantially greater than said first signal source output impedance and further valued to form an integrating network with said second capacitor for said signal variations appearing at said cathode such that said signal variation at said cathode swings said cathode in a positive polarity direction relative to said control electrode, the value of said third resistor being further established to allow but a small percentage change in the average D.-C. potential of said anode upon fortuitous interruption of signals from said first source.

2. In a television receiver for receiving and demodulating a television signal having a video component and a synchronizing pulse component, the combination of: a signal datum means forming an electrical reference for the elements hereinafter recited; means for receiving and demodulating radio television signals; a synchronizing pulse separator circuit operatively coupled with said receiving and demodulating means to deliver at its output terminal positive going synchronizing signals referenced to said datum means, the output impedance of said separator circuit being relatively low as hereinafter defined; a cathode ray beam deflection circuit for said receiver, said deflection circuit having a frequency control input terminal designated to accept a direct current frequency control voltage for controlling the operating frequency of said deflection circuit, said deflection circuit further having an output terminal means referenced to said datum means for delivering positive going fly-back pulses representing the operation of said deflection circuit; a vacuum tube having at least an anode, cathode and control electrode; a first resistor galvanically connected between said cathode and said datum means; a first capacitor connected from said anode to said deflection circuit output terminal to apply said fly-back pulses to said anode for rectification by said vacuum tube; a second resistor directly connected between said anode and said cathode of sufficient value to permit anode current flow due to fly-back pulse rectification to develop at said anode a direct current voltage of sufficient magnitude for application to said deflection circuit frequency control terminal, the connection of said second resistor further providing the appearance at said cathode of positive going pulses corresponding in general form and timing to said fly-back pulses; a second capacitor connected from said synchronizing pulse separator circuit output terminal to said control electrode; a third resistor galvanically connected directly from said control electrode to said cathode, the value of said third resistor being substantially greater than said relatively lower separator circuit output impedance and further valued to form an integration network with said second capacitor for said fly-back pulses appearing at said cathode such that said fly-back pulses at said cathode causes said cathode to swing in a positive polarity direction relative to said control electrode; and a galvanically conducting integrating network direct current connected between said anode and said deflection circuit frequency control terminal.

References Cited in the file of this patent

UNITED STATES PATENTS

| | | |
|---|---|---|
| 2,561,817 | Parker | July 24, 1951 |
| 2,566,762 | English | Sept. 4, 1951 |
| 2,632,050 | Parker | Mar. 17, 1953 |
| 2,645,717 | Massman | July 14, 1953 |

FOREIGN PATENTS

| | | |
|---|---|---|
| 639,065 | Great Britain | June 21, 1950 |